US011362566B2

(12) United States Patent
Tanaka et al.

(10) Patent No.: US 11,362,566 B2
(45) Date of Patent: Jun. 14, 2022

(54) TOROIDAL CONTINUOUSLY VARIABLE TRANSMISSION AND INTEGRATED DRIVE GENERATOR

(71) Applicant: KAWASAKI JUKOGYO KABUSHIKI KAISHA, Kobe (JP)

(72) Inventors: Kenichiro Tanaka, Kobe (JP); Hideyuki Imai, Akashi (JP); Akihito Abe, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 1312 days.

(21) Appl. No.: 15/556,695

(22) PCT Filed: Mar. 8, 2016

(86) PCT No.: PCT/JP2016/001256
§ 371 (c)(1),
(2) Date: Sep. 8, 2017

(87) PCT Pub. No.: WO2016/143330
PCT Pub. Date: Sep. 15, 2016

(65) Prior Publication Data
US 2018/0062480 A1    Mar. 1, 2018

(30) Foreign Application Priority Data

Mar. 9, 2015  (JP) .............................. JP2015-046329

(51) Int. Cl.
*H02K 7/116* (2006.01)
*B64D 41/00* (2006.01)
(Continued)

(52) U.S. Cl.
CPC ............. *H02K 7/116* (2013.01); *B64D 41/00* (2013.01); *F16H 15/38* (2013.01); *F16H 57/04* (2013.01);
(Continued)

(58) Field of Classification Search
CPC .......... H02K 7/116; H02K 7/10; B64D 41/00; F16H 15/38; F16H 57/04; F16H 57/0436; F05D 2270/304

See application file for complete search history.

(56) References Cited

U.S. PATENT DOCUMENTS 5,879,260 A * 3/1999 Yoshida .................. F16H 57/04
475/216
2002/0039948 A1* 4/2002 Ooyama ................. F16H 57/04
476/40

(Continued)

FOREIGN PATENT DOCUMENTS

JP    2001-330100 A    11/2001
JP    2002-106667 A     4/2002

(Continued)

OTHER PUBLICATIONS

Communication dated Nov. 26, 2018 from the European Patent Office in counterpart Application No. 16761304.1.

(Continued)

*Primary Examiner* — David M Fenstermacher
(74) *Attorney, Agent, or Firm* — Sughrue Mion, PLLC

(57) ABSTRACT

A toroidal continuously variable transmission comprises an input disc and an output disc which are disposed to face each other; a power roller which is tiltably disposed between the input disc and the output disc and transmits a rotational driving force of the input disc to the output disc in a transmission ratio corresponding to a tilt motion angle of the power roller; a trunnion including a base on which the power roller is rotatably mounted, and a pair of side walls provided on both sides of the power roller in an axial direction of a tilt motion shaft of the power roller in such a manner that the pair of side walls extend upward from the base and face a peripheral surface of the power roller, and a beam mounted on the pair of side walls, the beam extending in the axial (Continued)

direction of the tilt motion shaft, on a side opposite to the base when viewed from a position of the power roller, wherein the beam includes a pair of contact portions, each of the contact portions being configured to contact an end surface of a tip end side of each of the pair of side walls, and a pair of restricting portions configured to contact side surfaces of the pair of side walls, respectively, the side surfaces facing each other, to restrict a movement of the pair of side walls in a direction in which the pair of side walls approach each other.

18 Claims, 8 Drawing Sheets

(51) Int. Cl.
  *F16H 15/38* (2006.01)
  *F16H 57/04* (2010.01)
  *H02K 7/10* (2006.01)
(52) U.S. Cl.
  CPC ....... *F16H 57/042* (2013.01); *F16H 57/0436* (2013.01); *H02K 7/10* (2013.01); *F05D 2260/4031* (2013.01); *F05D 2270/304* (2013.01)

(56) References Cited

U.S. PATENT DOCUMENTS

| | | | |
|---|---|---|---|
| 2010/0200692 A1* | 8/2010 | Goi | F16H 61/6649 244/58 |
| 2018/0066735 A1* | 3/2018 | Komatsu | F16H 15/52 |
| 2018/0237154 A1* | 8/2018 | Tanaka | F01D 15/10 |
| 2020/0063837 A1* | 2/2020 | Itagaki | F16H 61/6649 |
| 2021/0380270 A1* | 12/2021 | Nakashima | H02P 9/04 |

FOREIGN PATENT DOCUMENTS

| | | |
|---|---|---|
| JP | 2003-65408 A | 3/2003 |
| JP | 2003-202062 A | 7/2003 |
| JP | 2007-523310 A | 8/2007 |
| JP | 2009-275745 A | 11/2009 |
| JP | 2010-179815 A | 8/2010 |
| JP | 2013-19546 A | 1/2013 |
| WO | 2012/137843 A1 | 10/2012 |

OTHER PUBLICATIONS

International Search Report for PCT/JP2016/001256 dated Jun. 14, 2016.

* cited by examiner

TOROIDAL CONTINUOUSLY VARIABLE TRANSMISSION AND INTEGRATED DRIVE GENERATOR

CROSS REFERENCE TO RELATED APPLICATIONS

This application is a National Stage of International Application No. PCT/JP2016/001256, filed on Mar. 8, 2016, which claims priority from Japanese Patent Application No. 2015-046329, filed on Mar. 9, 2015, the contents of all of which are incorporated herein by reference in their entirety.

TECHNICAL FIELD

The present invention relates to a toroidal continuously variable transmission (toroidal CVT), and an integrated drive generator.

BACKGROUND ART

A toroidal continuously variable transmission (toroidal CVT) includes power rollers disposed so that peripheral surfaces thereof contact an input disc and an output disc, with an oil film (membrane) formed between the peripheral surfaces, and the input and output discs, in an annular cavity formed between the input and output discs, and trunnions (support members) on which the power rollers are rotatably supported. Each of the trunnions includes a base and a pair of side walls provided on the base on radially both sides of a roller rotary shaft. In an exemplary configuration disclosed in Patent Literature 1, a beam is mounted on the pair of side walls of the trunnion for the purpose of reinforcement.

The toroidal CVT is used for various purposes. For example, the toroidal CVT is used in an electric power generating device for an aircraft which employs an integrated drive generator (IDG) method in which an electric power generator is rotated at a constant rotational speed irrespective of an engine speed to generate electric power with a constant frequency. The electric power generating device includes a toroidal CVT which changes the engine speed, the electric power generator which generates the electric power by an output of the transmission, and a driving force transmission mechanism which transmits the output of the transmission to the electric power generator. As disclosed in Patent Literature 2, for example, the electric power generating device is mounted on a fan case of an engine.

CITATION LIST

Patent Literature

Patent Literature 1: Japanese Laid-Open Patent Application Publication No. 2013-19546
Patent Literature 2: WO2012/137843A1 Publication

SUMMARY OF INVENTION

Technical Problem

As disclosed in Patent Literature 1, in some cases, in the toroidal CVT, a plurality of assembly units each including a power roller, a trunnion, and a beam are disposed in one cavity. In this toroidal CVT, the assembly units are required to be efficiently formed, to achieve high manufacturing efficiency.

In view of the above-described circumstances, an object of the present invention is to efficiently form the assembly unit including the power roller, the trunnion, and the beam of the toroidal CVT.

Solution to Problem

To solve the above-described problem, according to an aspect of the present invention, a toroidal continuously variable transmission comprises an input disc and an output disc which are disposed to face each other; a power roller which is tiltably disposed between the input disc and the output disc and transmits a rotational driving force of the input disc to the output disc in a transmission ratio corresponding to a tilt motion angle of the power roller; a trunnion including a base on which the power roller is rotatably mounted, and a pair of side walls provided on both sides of the power roller in an axial direction of a tilt motion shaft of the power roller in such a manner that the pair of side walls extend upward from the base and face a peripheral surface of the power roller; and a beam mounted on the pair of side walls, the beam extending in the axial direction of the tilt motion shaft, on a side opposite to the base when viewed from a position of the power roller, wherein the beam includes a pair of contact portions, each of the contact portions being configured to contact an end surface of a tip end side of each of the pair of side walls, and a pair of restricting portions configured to contact side surfaces of the pair of side walls, respectively, the side surfaces facing each other, to restrict a movement of the pair of side walls in a direction in which the pair of side walls approach each other.

In accordance with this configuration, since each of the pair of contact portions of the beam contacts the end surface of the tip end side of each of the pair of side walls, the beam and the trunnion can be positioned with respect to each other in the extending direction of the pair of side walls. In addition, since the pair of restricting portions contact the side surfaces of the pair of side walls, respectively, the side surfaces facing each other, it becomes possible to restrict a displacement of the pair of side walls in a direction in which the pair of side walls approach each other. This makes it possible to position the beam and the trunnion in the extending direction of the pair of side walls and quickly and properly mount the beam on the trunnion, while effectively reinforcing the trunnion with the beam.

In accordance with the toroidal continuously variable transmission (toroidal CVT) according to the above-described aspect, it becomes possible to efficiently form the assembly unit including the power roller, the trunnion, and the beam.

Advantageous Effects of Invention

In accordance with the present invention, it becomes possible to efficiently form the assembly unit including the power roller, the trunnion, and the beam.

DESCRIPTION OF EMBODIMENTS

Hereinafter, the embodiment of the present invention will be described with reference to the drawings.

[Electric Power Generating Device for Aircraft]

Figure 1:
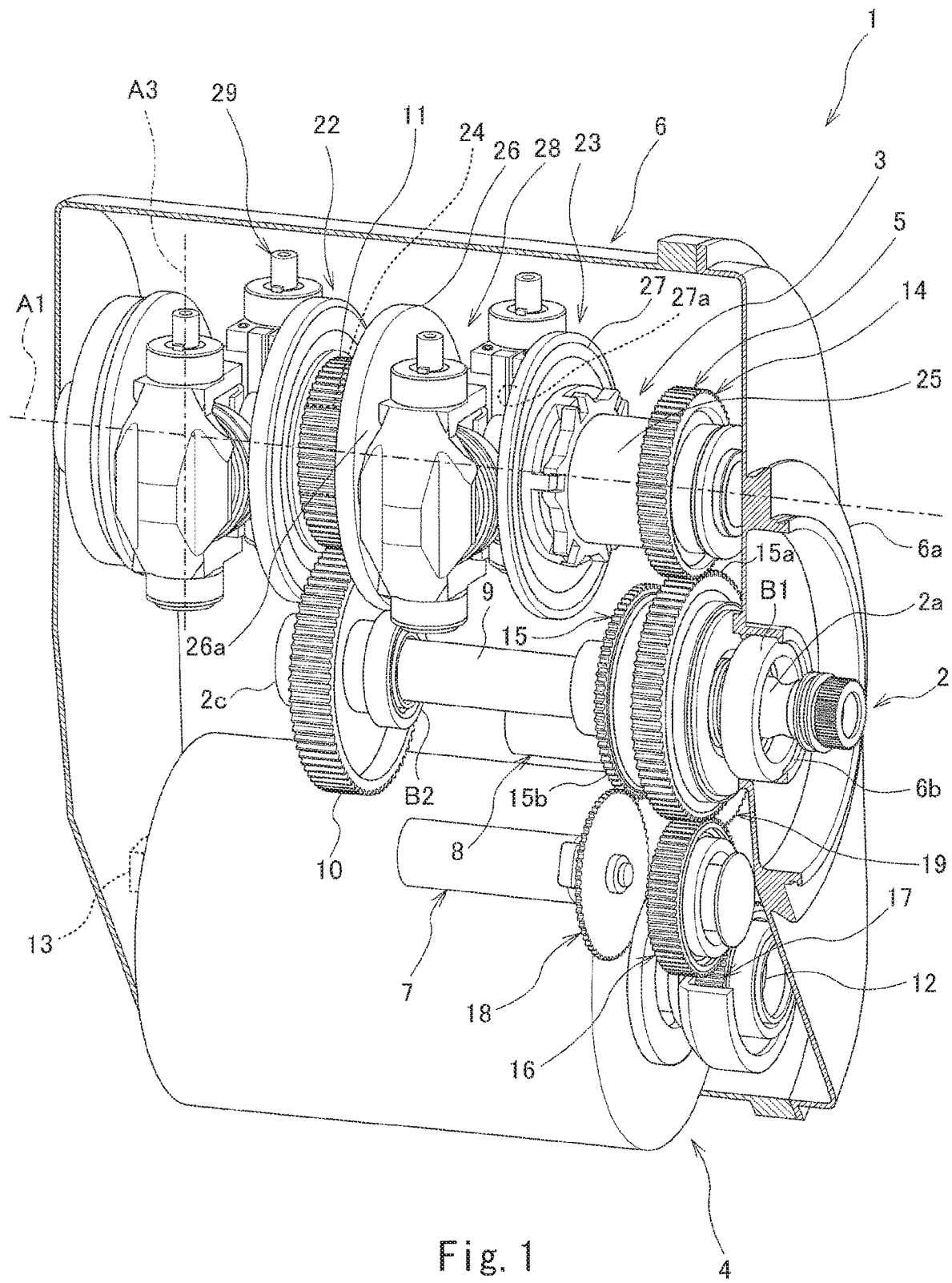
FIG. 1 is a cross-sectional perspective view showing the configuration of an electric power generating device for an aircraft according to an embodiment.

FIG. 1 is a cross-sectional perspective view showing the configuration of an electric power generating device 1 for an aircraft (hereinafter this will also be referred to as a "electric power generating device 1") according to an embodiment. The electric power generating device 1 is an integrated drive generator (IDG). The electric power generating device 1 includes a device input shaft 2 as an input shaft to which a rotational driving force of an engine (not shown) is externally transmitted, a transmission 3 arranged with the device input shaft 2, an electric power generator 4 which is arranged with the device input shaft 2 and the transmission 3 and driven by an output of the transmission 3, a driving force transmission mechanism 5 which is disposed on a first end 2a side of the device input shaft 2 in an axial direction thereof and transmits the output of the transmission 3 to the electric power generator 4, a casing 6 including a mounting section 6a on the first end 2a side of the device input shaft 2 in the axial direction, and at least one auxiliary unit such as oil pumps 7, 8 driven by the output of the transmission 3.

The device input shaft 2 transmits the rotational driving force of the engine to the transmission 3. The device input shaft 2 includes a shaft body 9, and a transmission gear 10 disposed in the vicinity of the end portion of the shaft body 9 on a second end 2c side of the device input shaft 2 in the axial direction, which is close to a transmission input gear 11. The transmission gear 10 is in mesh with the transmission input gear 11. The device input shaft 2 is rotatably supported by a bearing B1 provided on the peripheral portion of an opening 6b of the casing 6 and a bearing B2 provided inside the casing 6.

The electric power generator 4 includes a generator input shaft 12 provided on the first end 2a side of the device input shaft 2 in the axial direction, which is close to the opening 6b of the casing 6. The generator input shaft 12 serves to input the driving force to the electric power generator 4. When the output of the transmission 3 is input to the generator input shaft 12 via the driving force transmission mechanism 5, the electric power is generated inside the electric power generator 4, and is taken out of the electric power generator 4 through a terminal 13 exposed outside the casing 6. In the electric power generating device 1, a transmission ratio set in the transmission 3 is adjusted so that the output of the transmission 3 is input as the rotational driving force at a constant rotational speed to the generator input shaft 12 via the driving force transmission mechanism 5. By this driving force, the electric power generator 4 generates alternating current (AC) power with a constant frequency. The AC power is supplied to an external device via the terminal 13.

The driving force transmission mechanism 5 transmits the output of the transmission 3 to the electric power generator 4 and the oil pumps 7, 8 or the like. The driving force transmission mechanism 5 includes a first gear 14 provided on a transmission output shaft 25 of the transmission 3, the output of the transmission 3 being transmitted to the first gear 14, a second gear 15 which meshes with the first gear 14, a third gear 16 which meshes with a main gear portion 15a of the second gear 15, a fourth gear 17 which meshes with the third gear 16 to input the driving force to the generator input shaft 12 of the electric power generator 4, a fifth gear 18 which meshes with a sub-gear portion 15b of the second gear 15 to transmit the driving force to the oil pump 7, and a sixth gear 19 which meshes with the sub-gear portion 15b of the second gear 15 to transmit the driving force to the oil pump 8. The driving force transmitted to the fifth gear 18 is used to drive the oil pump 7. The driving force transmitted to the sixth gear 19 is used to drive the oil pump 8. Inside the casing 6, the driving force transmission mechanism 5 is disposed at a location which is in the vicinity of the mounting section 6a.

The casing 6 is configured as a flat box which is thin and is longitudinally elongated. The mounting section 6a is provided as an annular flange on a side portion of the casing 6. The electric power generating device 1 is mounted on the engine in such a manner that a mounting member such as a clamp band is provided around the mounting section 6a. In a region surrounded by the mounting section 6a, the opening 6b connected to the inside space of the casing 6 is formed. Through the opening 6b, the first end 2a of the device input shaft 2 in the axial direction is exposed outside the casing 6.

The oil pump 7 is an oil feeding pump which feeds lubricating oil to the transmission 3, the driving force transmission mechanism 5, or the like. The oil pump 8 is an oil suction pump which suctions up the oil reserved in the casing 6.

[Transmission]

The transmission 3 is, for example, a traction drive continuously variable transmission (CVT) and is a double (dual) cavity half toroidal CVT. The transmission 3 includes an input section 22 which is provided on the second end 2c side of the device input shaft 2 in the axial direction, the output from the device input shaft 2 being input to the input section 22, and an output section 23 which is provided on the first end 2a side of the device input shaft 2 in the axial direction, the output section 23 being configured to transmit the output with a changed speed to the driving force transmission mechanism 5. More specifically, the transmission 3 includes a transmission input shaft 24 which has a hollow space and is rotatably supported on a bearing (not shown) inside the casing 6, and a transmission output shaft 25 which is inserted into the hollow space of the transmission input shaft 24 in such a manner that the axial center portion of the transmission output shaft 25 is covered by the transmission input shaft 24, the transmission output shaft 25 being rotatable independently of the transmission input shaft 24. In the present embodiment, the rotational center axis of the transmission input shaft 24 and the rotational center axis of the transmission output shaft 25 conform to a transmission center axis. In the present embodiment, hereinafter, an axis (axis line) extending through the transmission center axis will be referred to as a transmission axis A1.

The transmission 3 includes the transmission input gear 11 which is a constituent of the input section 22, a pair of input discs 26 provided on both sides of the transmission input gear 11, and a pair of output discs 27 provided on the transmission output shaft 25 in such a manner that each of the output discs 27 faces the corresponding one of the input discs 26. The transmission input gear 11, and the pair of input discs 26 are rotatable around the transmission axis A1 together with the transmission input shaft 24. The pair of output discs 27 are rotatable around the transmission axis A1 together with the transmission output shaft 25. Between each of the input discs 26 and the corresponding output disc 27 which face each other, an annular cavity 28 is formed. Cavities 28 are formed around the transmission axis A1 and form a pair in a direction of the transmission axis A1. In the transmission 3, one of the output discs 27 which is closer to the mounting section 6a functions as the constituent of the output section 23.

Figure 2:
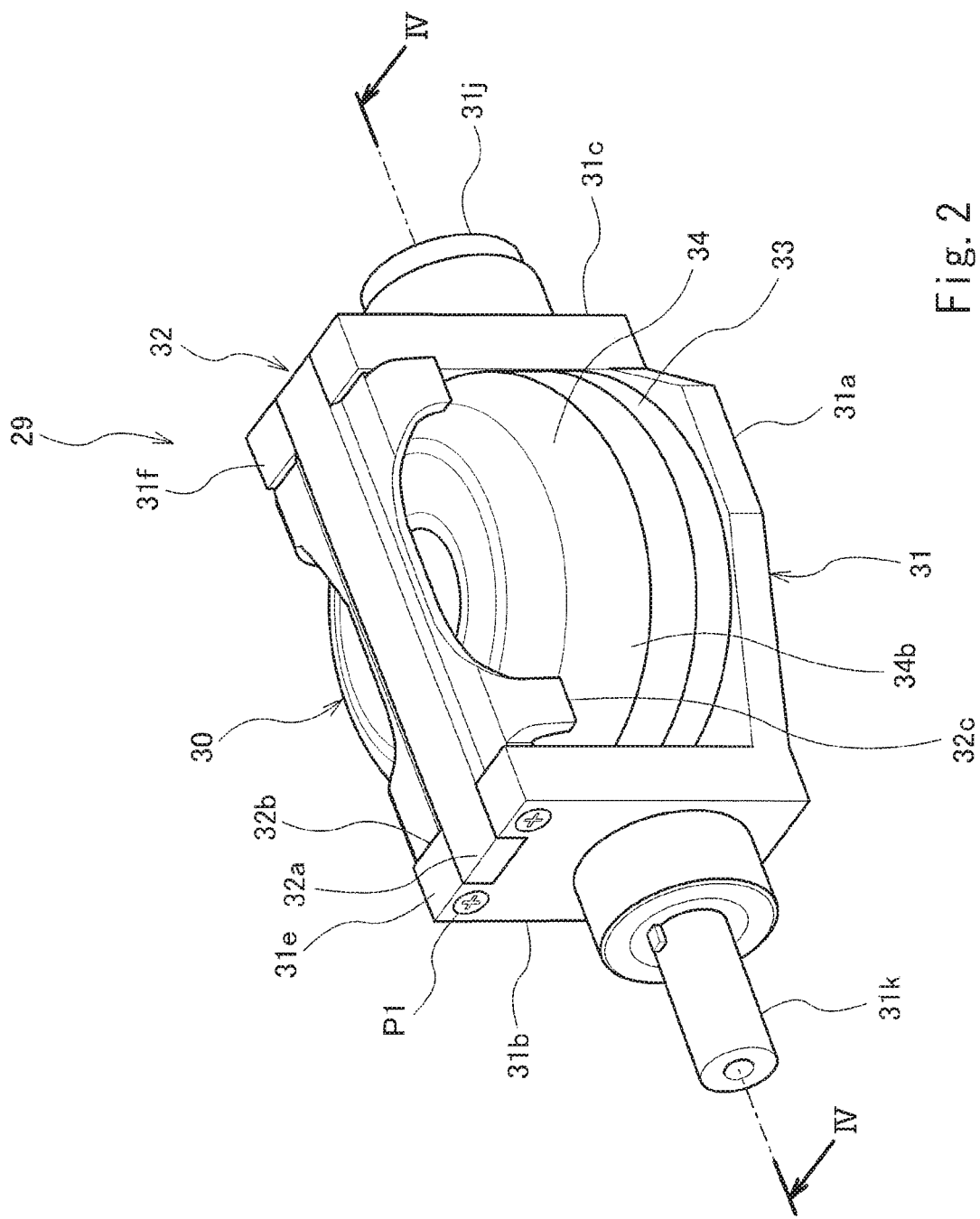
FIG. 2 is a perspective view showing the configuration of a transmission unit.
Figure 3:
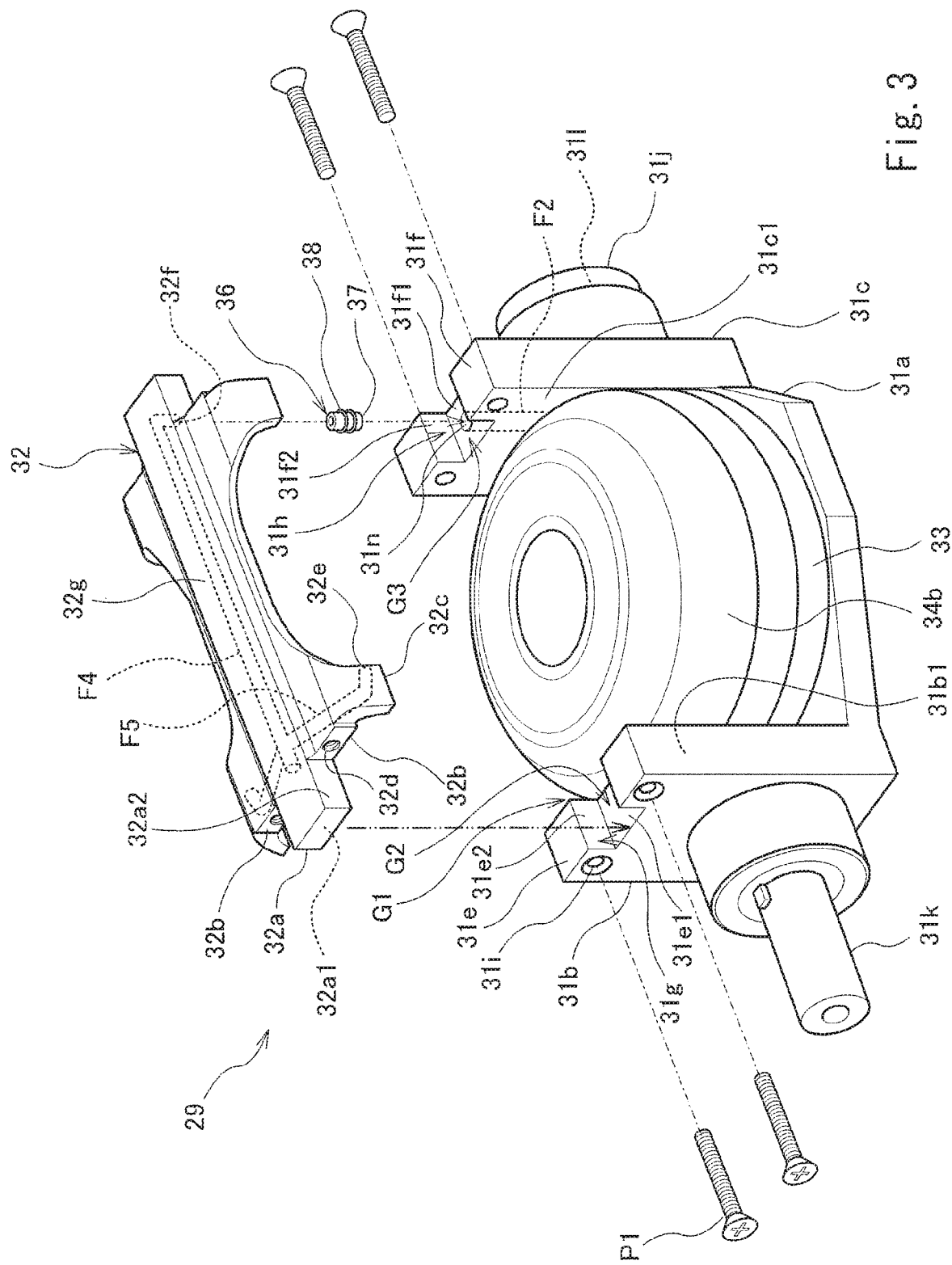
FIG. 3 is a partially exploded view of the transmission unit.
Figure 4:
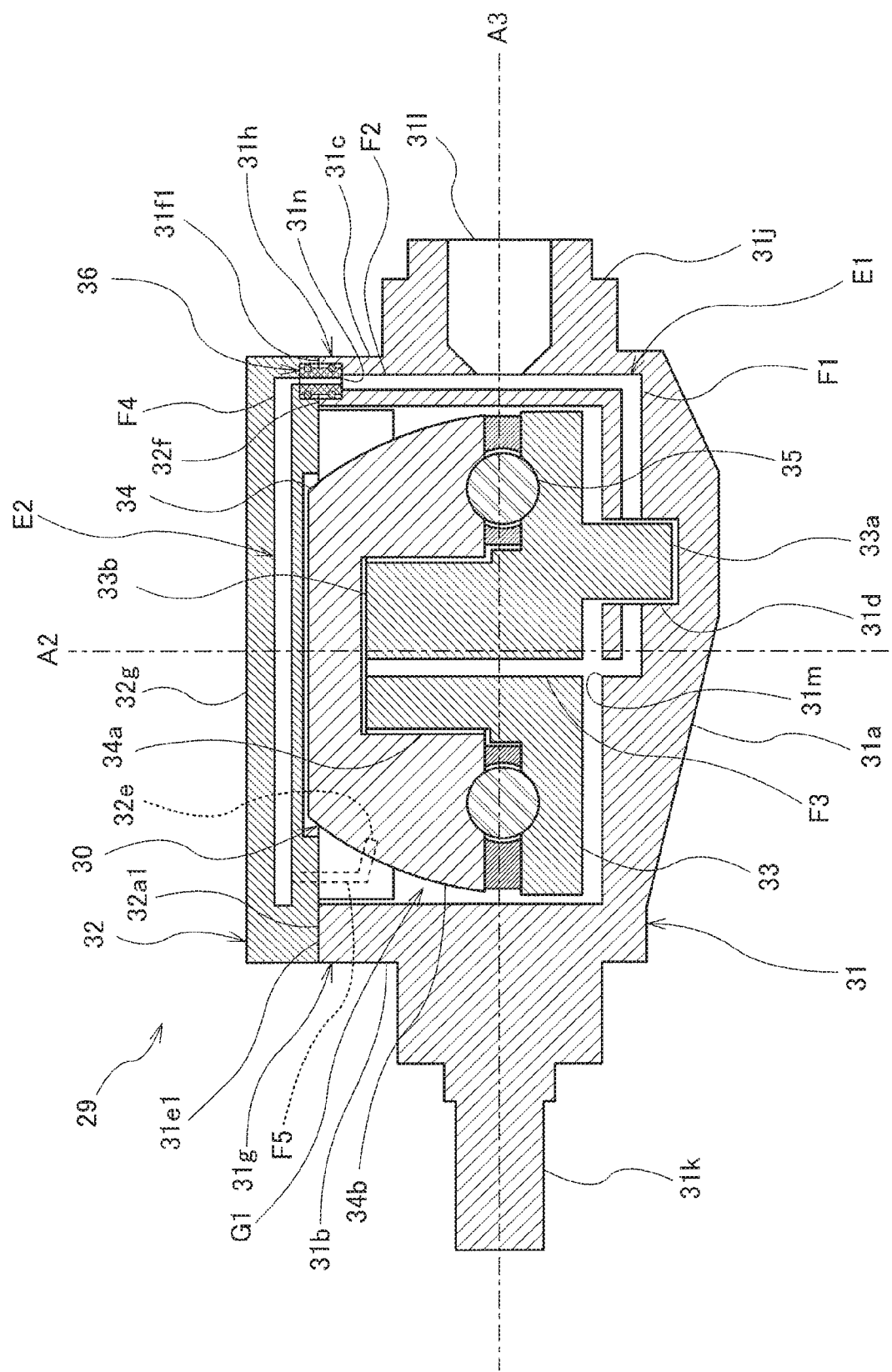
FIG. 4 is a cross-sectional view of the transmission unit, taken in the direction of arrows along line IV-IV of FIG. 2.

The transmission 3 includes a plurality of transmission units 29 disposed in the cavities 28. FIG. 2 is a perspective view showing the configuration of the transmission unit 29. FIG. 3 is a partially exploded view of the transmission unit 29. FIG. 4 is a cross-sectional view of the transmission unit 29 taken in the direction of arrows along line IV-IV of FIG. 2. As shown in FIGS. 2 and 3, each of the transmission units 29 is an assembly unit including a power roller unit 30, a trunnion 31, and a beam 32. As shown in FIG. 1, in the transmission 3, a pair of transmission units 29 are arranged in each of the pair of cavities 28 arranged in the direction of the transmission axis A1.

The power roller unit 30 is supported on the trunnion 31. As shown in FIG. 4, the power roller unit 30 includes a support section 33 mounted on the trunnion 31, a power roller 34 with a substantially semi-spherical shape which is rotatably supported on the support section 33, and a bearing 35 disposed between the support section 33 and the power roller 34 and supporting the power roller 34 in such a manner that the power roller 34 is rotatable. The support section 33 is a plate member with a substantially disc shape. The support section 33 is supported on the trunnion 31 at an eccentric shaft 33a protruding toward the trunnion 31. The support section 33 includes a roller rotary shaft 33b protruding along a rotational axis A2, in a direction opposite to the protruding direction of the eccentric shaft 33a. The power roller 34 has a recessed shaft support portion 34a in a portion facing the roller rotary shaft 33b. The roller rotary shaft 33b is inserted into the shaft support portion 34a. In this state, the power roller 34 is supported in such a manner that the power roller 34 is rotatable around the axis of the roller rotary shaft 33b. In this way, the power roller 34 is supported in such a manner that the power roller 34 is rotatable around a rotational axis (first axis) A2 extending in a direction different from the direction of the transmission axis A1. The rotational axis A2 is skew with respect to the transmission axis A1. The power roller 34 has a peripheral surface 34b which is a gently curved surface. During the operation of the electric power generating device 1, an oil film (membrane) with a high viscosity is formed on the peripheral surface 34b. The transmission 3 includes a pressing mechanism (not shown) disposed at a location which is in the vicinity of one of the output discs 27. The pressing mechanism is configured to cause the input disc 26 and the output disc 27 to sandwich the peripheral surface 34b of the power roller 34 with a predetermined pressing force. The power roller 34 is sandwiched between a surface 26a of the input disc 26 and a surface 27a of the output disc 27, the surfaces 26a, 27a facing each other, with the oil film interposed between the power roller 34 and the surfaces 26a, 27a of the input and output discs 26, 27, while the power roller 34 is pressed by the pressing mechanism. In the transmission 3, the rotational driving force of the input disc 26 is transmitted to the output disc 27 via the power roller 34, by making use of a viscosity resistance (fluid friction) of the oil film.

The trunnion 31 supports the power roller unit 30 in a state in which the trunnion 31 externally covers a portion of the outer peripheral surface 34b. In the transmission 3, each of the trunnions 31 is pivotable around a tilt motion axis (second axis) A3. The tilt motion axis A3 is skew with respect to the transmission axis A1 and is orthogonal to the rotational axis A2. As shown in FIGS. 3 and 4, the trunnion 31 includes a base 31a extending in the direction of the tilt motion axis A3, the power roller unit 30 being mounted on the base 31a, and a pair of side walls 31b, 31c provided on both sides of the power roller unit 30 in the direction of the tilt motion axis A3 (in the axial direction of the tilt motion shaft) in such a manner that the side walls 31b, 31c extend upward from the base 31a and face the peripheral surface 34b of the power roller 34.

The base 31a has a shaft support portion 31d for supporting the eccentric shaft 33a in such a manner that the eccentric shaft 33a is rotatable, on one of the surfaces of the base 31a. The pair of side walls 31b, 31c protrude from the both sides of the base 31a in a lengthwise direction thereof. A space G1 is formed between the pair of side walls 31b, 31c. The plate thickness directions of the pair of side walls 31b, 31c conform to the direction of the tilt motion axis A3. The pair of side walls 31b, 31c have end surfaces 31e, 31f, respectively, of the tip end sides in the extending direction of the pair of side walls 31b, 31c.

The end surfaces 31e, 31f have grooves 31g, 31h, respectively, in center portions thereof. The grooves 31g, 31h are formed by depressing the center regions of the end surfaces 31e, 31f. As shown in FIG. 3, the grooves 31g, 31h are opened toward both sides in the direction of the tilt motion axis A3. In the groove 31g, an accommodating space G2 is defined by a bottom surface 31e1 and a pair of side surfaces 31e2 provided on the both sides of the bottom surface 31e1 and facing each other. In the groove 31h, an accommodating space G3 is defined by a bottom surface 31f1 and a pair of side surfaces 31f2 provided on the both sides of the bottom surface 31f1 and facing each other. Each of the pair of side walls 31b, 31c has a plurality of insertion holes 31i penetrating the side wall 31b, 31c in the direction of the tilt motion axis A3.

Each of tilt motion shafts (short shaft 31j and long shaft 31k) is provided outside the corresponding one of the pair of side walls 31c, 31b, when viewed from the position of the power roller unit 30. The tilt motion shafts extend in the direction of the tilt motion axis A3. An actuator (not shown) is coupled to one of the short shaft 31j and the long shaft 31k. In the transmission 3, each of the plurality of transmission units 29 is supported in the corresponding short shaft 31j and the corresponding long shaft 31k in such a manner that the transmission unit 29 is tiltable around the tilt motion axis A3. This allows each of the power rollers 34 to be tiltable around the tilt motion axis A3. A tilt motion angle (rotation angle with respect to a reference position around the tilt motion axis A3) of the transmission unit 29 is adjustable by moving the power roller 34 in the direction of the tilt motion axis A3 by use of the above-described actuator. By controlling the operation of the actuator, the tilt motion angle of the power roller 34 in the transmission unit 29 is adjusted. The power roller 34 transmits the rotational driving force of the input disc 26 to the output disc 27 in a transmission ratio corresponding to the tilt motion angle.

The beam 32 extends in the direction of the tilt motion axis A3 (axial direction of the tilt motion shaft), at a location which is on a side opposite to the base 31a of the trunnion 31, when viewed from the position of the power roller 34. The beam 32 is mounted on the pair of side walls 31b, 31c to reinforce the trunnion 31. The beam 32 is an elongated member extending in the direction of the tilt motion axis A3. The beam 32 includes an elongated body portion 32g extending between the pair of side walls 31b, 31c, a pair of contact portions 32a provided at locations which are close to the both ends of the body portion 32g in the lengthwise direction, two pairs of restricting portions 32b provided in such a manner that each pair of restricting portions 32b are closer to a center in the lengthwise direction than the corresponding one of the pair of contact portions 32a is, and four extended portions 32c extending in the widthwise direction of the beam 32 from each one pair of restricting portions 32b.

In a state in which the beam 32 is mounted on the pair of side walls 31b, 3 c, the pair of contact portions 32a extend in the lengthwise direction of the body portion 32g, farther than side surfaces 31b1, 31c1 of the pair of side walls 31b, 31c, the side surfaces 31b1, 31c1 facing the peripheral surface 34b of the power roller 34. The size and shape of the contact portions 32a are set so that each of the contact portions 32a can be accommodated in the corresponding one of the grooves 31g, 31h. More precisely, the size and shape of the contact portions 32a are substantially the same as those of the grooves 31g, 31h, or are set so that each of the contact portions 32a is fittable into corresponding one of the grooves 31g, 31h.

Each of the contact portions 32a includes a first surface 32a1 facing the bottom surface 31e1 or 31f1, and a pair of second surfaces 32a2 facing the pair of side surfaces 31e2 or 31f2.

The pair of second surfaces 32a2 sandwich the first surface 32a1 therebetween. In a state in which the beam 32 is mounted on the pair of side walls 31b, 31c, the first surface 32a1 of one of the contact portions 32a faces the bottom surface 31e1 of the groove 31g, and each of the pair of second surfaces 32a2 of this contact portion 32a faces the corresponding one of the pair of side surfaces 31e2 of the groove 31g. In the same manner, in a state in which the beam 32 is mounted on the pair of side walls 31b, 31c, the first surface 32a1 of the other of the contact portions 32a faces the bottom surface 31f1 of the groove 31h, and each of the pair of second surfaces 32a2 of this contact portion 32a faces the corresponding one of the pair of side surfaces 31f2 of the groove 31h.

The cross-section of each of the contact portions 32a, which is orthogonal to the lengthwise direction of the beam 32, has a rectangular shape. In a state in which the beam 32 is mounted on the pair of side walls 31b, 31c, as shown in FIG. 3, each of the contact portions 32a of the beam 32 is engaged with (fitted to) corresponding one of the grooves 31g, 31h of the trunnion 31. At this time, since each of the first surfaces 32a1 is in contact with corresponding one of the bottom surfaces 31e1, 31f1, a movement of the beam 32 in a direction in which the beam 32 approaches the base 31a of the trunnion 31 is restricted. In the same manner, since the second surfaces 32a2 are in contact with the side surfaces 31e2, 31f2, a movement of the beam 32 in the widthwise direction, namely, a movement of the beam 32 in a direction which is orthogonal to the direction of the tilt motion axis A3 and the extending direction of the side walls 31b, 31c, is restricted. In this way, the beam 32 can be quickly positioned with respect to the trunnion 31.

Figure 5:
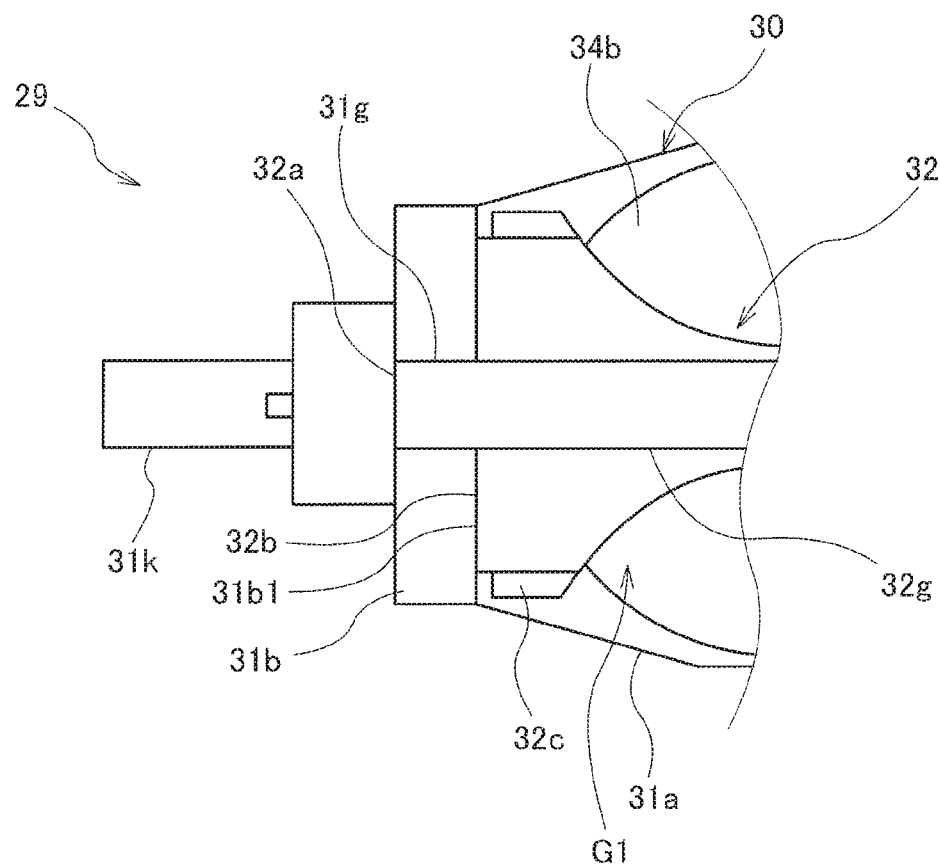
FIG. 5 is a partial top view of the transmission unit.

FIG. 5 is a partial top view of the transmission unit 29. As shown in FIGS. 3 and 5, the restricting portions 32b form a pair at a location which is in the vicinity of each of the both ends of the beam 32 in the lengthwise direction, and protrude outward in the widthwise direction from the body portion 32g. In this way, the restricting portions 32b are provided on the both sides of the body portion 32g in the widthwise direction. The restricting portions 32b are disposed in the spaces G1 and are in contact with the side surfaces 3b1, 31c1 of the pair of side walls 31b, 31c (see FIGS. 5 and 6). This allows the restricting portions 32b to restrict a displacement of the pair of side walls 31b, 31c, in a direction in which the side walls 31b, 31c approach each other. Therefore, for example, even in a case where the pressing force is exerted by the pressing mechanism and an external force transmitted to the roller rotary shaft 33b of the power roller unit 30 reaches the trunnion 31, during the operation of the electric power generating device 1, it becomes possible to prevent a situation in which the pair of side walls 31b, 31c are deformed in a direction in which they approach each other. The restricting portions 32b of the beam 32 protrude in the widthwise direction of the beam 32. Therefore, for example, in a case where an external force is applied to the trunnion 31 in a direction crossing the lengthwise direction of the beam 32 so that the trunnion 31 is twisted, it becomes possible to prevent a deformation of the trunnion 31. Since the deformation of the trunnion 31 can be prevented in the above-described manner without excessively increasing the thickness of the trunnion 31, the transmission unit 29 which is highly stiff and lightweight can be obtained.

As shown in FIG. 3, each of a plurality of insertion holes 32d is formed in the side surface of the restricting portion 32b at a location where the insertion hole 32d is aligned with the insertion hole 31i, in a state in which the beam 32 is joined to the trunnion 31. The beam 32 is threadingly engaged with the trunnion 31 at a plurality of points by use of a plurality of fastening members P1 such as screws which are inserted into the insertion holes 31i, 32d, from locations which are lateral of the pair of side walls 31b, 31c. In this way, the beam 32 is coupled to the pair of side walls 31b, 31c.

When each of the pair of contact portions 32a is fitted to corresponding one of the grooves 31g, 31h, the insertion hole 32d is aligned with the insertion hole 31i at the same time. Therefore, the fastening members P1 can be smoothly inserted into the insertion holes 31i, 32d, and fastening of the fastening members P1 can be quickly performed. In the transmission 3, the plurality of transmission units 29 are provided in the pair of cavities 28. Therefore, by quickly and properly joining the beam 32 to the trunnion 31 in the above-described manner, the transmission unit 29 can be efficiently formed. As a result, manufacturing efficiency of the transmission 3 can be increased.

The extended portions 32c are provided at locations which are in the vicinity of the both ends of the beam 32 in the lengthwise direction. The extended portions 32c extend toward the upper surface of the base 31a and the peripheral surface 34b of the power roller 34 in such a manner that the extended portions 32c are spaced apart from the side surfaces 31b1, 31c1 of the pair of side walls 31b, 31c.

As shown in FIGS. 3 and 4, the transmission unit 29 includes oil passages F1 to F5 which flow oil for lubricating and cooling the components of the transmission 3 and forming the oil film (oil membrane) on the peripheral surface 34b of the power roller 34, inside the power roller unit 30, the trunnion 31, and the beam 32. The oil passages F1 to F3 are included in a first oil passage E1 formed inside the trunnion 31. The oil passages F4 and F5 are included in a second oil passage E2 formed inside the beam 32 and connected to the first oil passage E1.

Specifically, the trunnion 31 includes the oil passage F1 extending from a first opening 31*l* formed in the end surface of the short shaft 31*j* to the shaft support portion 31*d* and a second opening 31*m* formed in the upper surface of the base 31*a*, through the inside of the base 31*a*, and the oil passage F2 which is, for example, branched or bent from the oil passage F1, and extends to a third opening 31*n* formed in the upper surface of the groove 31*h* in the end surface 31*f* of the side wall 31*c*, through the inside of the side wall 31*c*.

The power roller unit 30 includes the oil passage F3 penetrating the inside of the support section 33 in a thickness direction thereof. The oil passage F3 serves to feed the oil to the bearing 35 or the like of the power roller unit 30.

Figure 6:
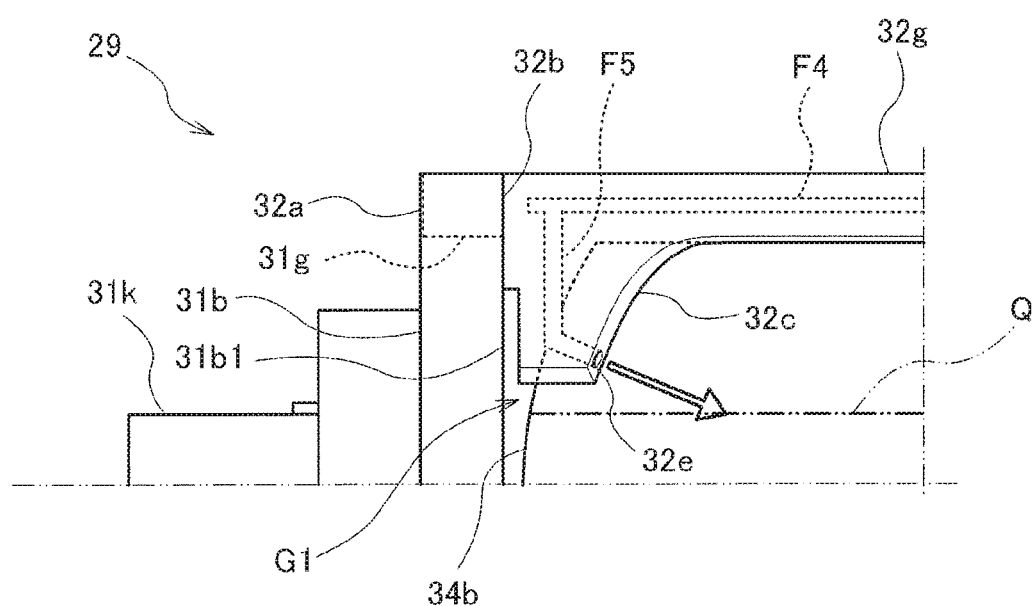
FIG. 6 is a partially enlarged view of a region which is in the vicinity of an injection port of a beam.

The beam 32 has a fourth opening 32*f* formed on a surface of the contact portion 32*a* which is in contact with the end surface 31*f* having the third opening 31*n*. The beam 32 includes the oil passage F4 extending in the lengthwise direction thereof from the fourth opening 32*f*, the oil passages F5 which extend in the extending directions of portions of the extended portions 32*c* in such a way that the oil passages F5 are for example, branched or bent from the oil passage F4, and injection ports 32*e* provided in the downstream portions of the oil passages F5 to inject the oil toward the peripheral surface 34*b* of the power roller 34. FIG. 6 is a partially enlarged view of a region which is in the vicinity of the injection port 32*e* of the beam 32. As shown in FIG. 6, the injection port 32*e* is formed in the side surface (surface closer to the power roller 34) of the extended portion 32*c* at a location which is in the vicinity of the tip end of the extended portion 32*c*. The injection port 32*e* is capable of injecting the oil toward a contact region Q (two-dot chain line in FIG. 6) of the peripheral surface 34*b* of the power roller 34 which contacts each of the surface 26*a* of the input disc 26 and the surface 27*a* of the output disc 27, from a tangential direction with respect to the peripheral surface 34*b* of the power roller 34.

In the transmission unit 29, in a state in which each of the pair of contact portions 32*a* is in contact with corresponding one of the end surfaces 31*e*, 31*f*, the periphery of the third opening 31*n* of the trunnion 31 is butted with the periphery of the fourth opening 32*f* of the beam 32. In this way, the oil passage F2 and the oil passage F4 are connected to each other. As shown in FIGS. 3 and 4, the third opening 31*n* and the fourth opening 32*f* are connected to each other via a seal member 36 to prevent oil leakage to an outside region. The seal member 36 includes a tubular member 37 with a circular cross-section, having an inner space extending in the extending direction of the oil passage F2, and a plurality of O-rings 38 disposed within annular grooves formed on the outer peripheral surface of the tubular member 37, the O-rings 38 being sealingly engageable with the inner peripheral surfaces of the oil passages F2, F4. In the transmission unit 29, the fastening direction of the fastening members P1 cross the extending direction of the side walls 31*b*, 31*c*. Even in a case where the pair of contact portions 32*a* are in contact with the grooves 31*g*, 31*h* with a low contact pressure, a high sealing performance between the third opening 31*n* and the fourth opening 32*f* can be maintained by use of the sealing member 36.

In the transmission unit 29, when the oil is externally fed to the first opening 31*l* of the short shaft 31*j*, a part of this oil flows through the oil passages F1, F3 and contacts the peripheral surface of the eccentric shaft 33*a*, the surface of the support section 33, the surface facing the base 31*a*, the bearing 35, and the like. In this way, the power roller 34 and the trunnion 31 are effectively lubricated and cooled. Furthermore, a part of this oil flows through the oil passages F2, F4 and F5, and is injected from the injection ports 32*e* toward the contact region Q of the peripheral surface 34*b* of the power roller 34, from the tangential direction with respect to the peripheral surface 34*b*. In this way, the above-described oil film is formed on the peripheral surface 34*b* including the contact region Q. In the transmission 3, lubrication, cooling and formation of the oil can be performed while saving the oil by efficiently injecting the oil to the contact region Q.

In the transmission unit 29, since the beam 32 includes the second oil passage E2 which flows the oil for forming the oil film on the peripheral surface 34*b* of the power roller 34, the structure of the first oil passage E1 formed inside the trunnion 31 can be simplified. This makes it possible to make the trunnion 31 lightweight and compact. In addition, the shape of the trunnion 31 can be simplified, and the trunnion 31 can be relatively easily formed. This can contribute to improvement of the manufacturing efficiency of the transmission 3.

Since the oil is fed to the roller rotary shaft 33*b* or the like, a relatively large pressure loss is generated on the base 31*a* side of the trunnion 31. In the transmission unit 29, by use of the oil passages F4, F5 formed in the beam 32, the influences of the pressure loss on the base 31*a* side can be avoided, and the oil can be properly fed to the peripheral surface 34*b* of the power roller 34. This makes it possible to sufficiently feed the oil to the injection ports 32*e* which are located in the vicinity of the long shaft 31*k* and distant from the short shaft 31*j*. As a result, the oil film can be stably formed on the peripheral surface 34*b* of the power roller 34.

The fastening members P1 are fastened along the lengthwise direction of the beam 32. Therefore, if a force is applied to the pair of side walls 31*b*, 31*c* in a direction in which the side walls 31*b*, 31*c* approach each other, this force is exerted in the fastening direction of the fastening members P1. Therefore, a load applied to the fastening members P1 can be reduced.

Modified Example 1

The configuration of the contact portions of the beam is not limited to the configuration of the above-described embodiment, in which each of the contact portions contacts the surface facing this contact portion, of the groove formed in the end surface of each of the side walls. For example, each of the contact portions of the beam may contact the end surface of the side wall, by surface contact to allow the trunnion and the beam to be aligned with each other along the extending direction of the side walls.

Figure 7:
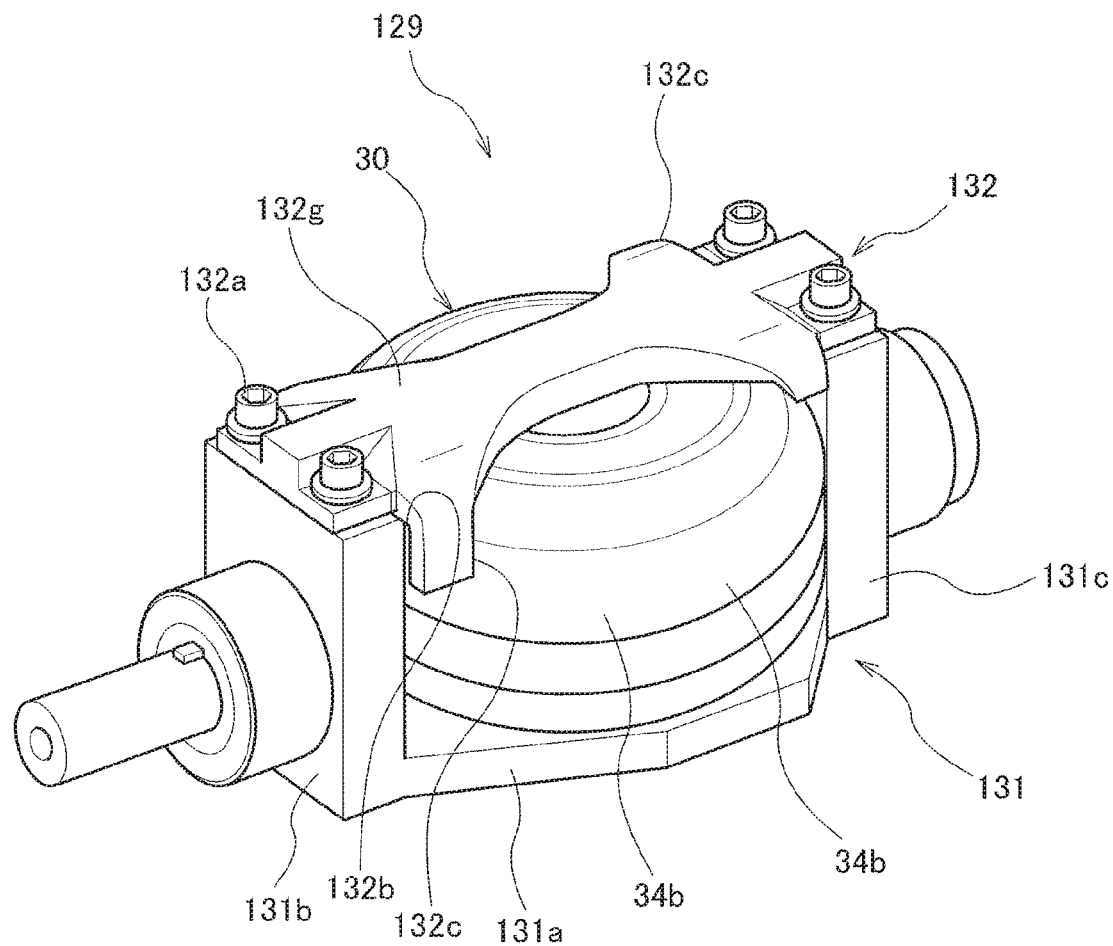
FIG. 7 is a perspective view showing the configuration of a transmission unit according to Modified example 1.
Figure 8:
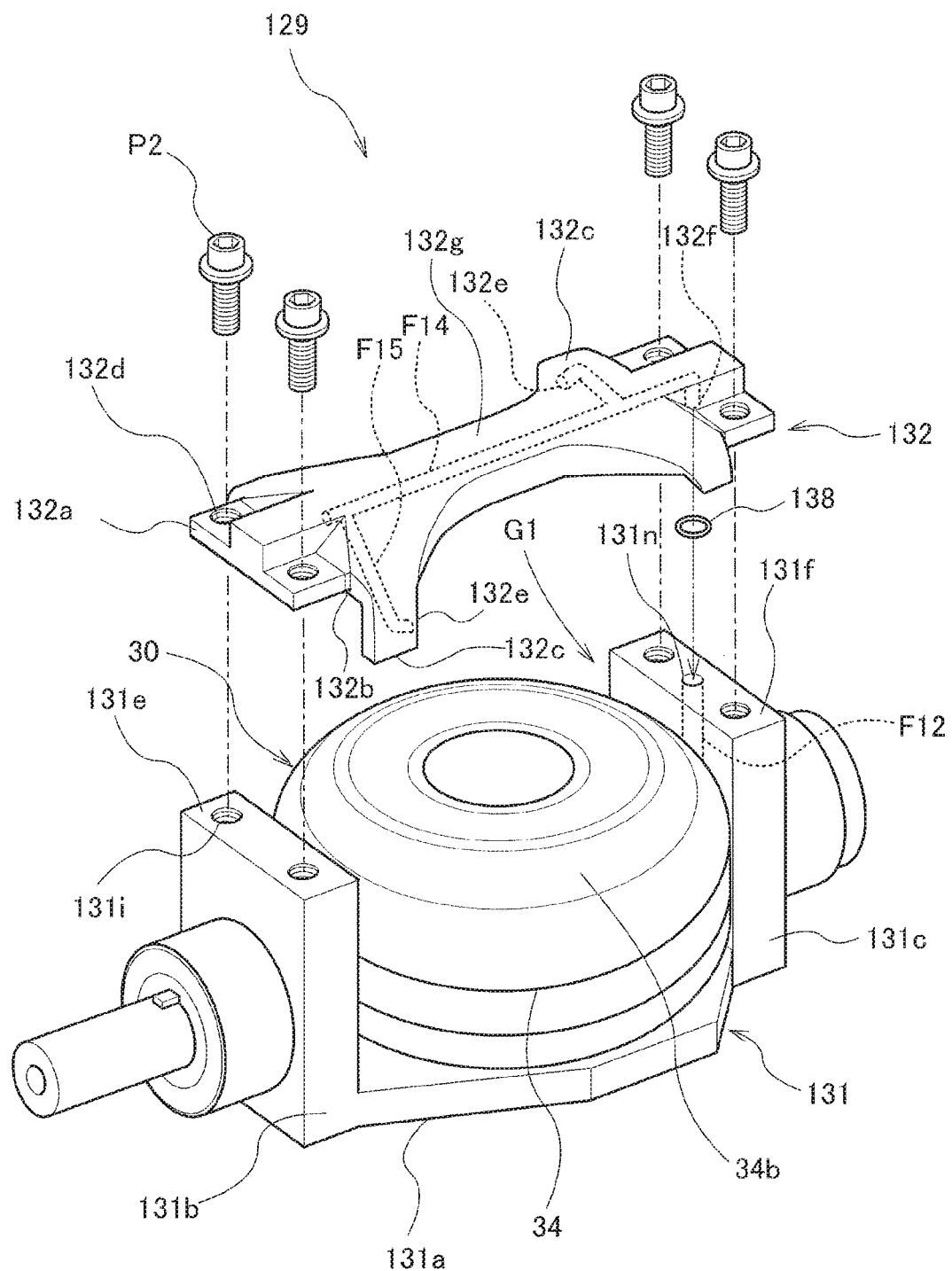
FIG. 8 is a partially exploded view of the transmission unit.

FIG. 7 is a perspective view showing the configuration of a transmission unit 129 according to Modified example 1. FIG. 8 is a partially exploded view of the transmission unit 129. As shown in FIGS. 7 and 8, a trunnion 131 of the transmission unit 129 has flat end surfaces 131*e*, 131*f*, on the tip end side of a pair of side walls 131*b*, 131*c* provided on a base 131*a*. A beam 132 includes a pair of contact portions 132*a* protruding outward from the both ends of a body portion 132*g* in a lengthwise direction thereof. The contact portions 132*a* have a flat plate shape. During assembling of the transmission unit 129, the surface of each of the pair of contact portions 132*a* contacts the corresponding one of end surfaces 131*e*, 131*f* by surface contact. This allows the trunnion 131 and the beam 132 to be quickly and properly aligned with each other in the extending direction of the pair of side walls 131*b*, 131*c*. The end surfaces 131*e*, 131*f* have a plurality of insertion holes 131i extending in the extending direction of the pair of side walls 131b, 131c. The pair of contact portions 132a have a plurality of insertion holes 132d, each of the insertion holes 132d being located to be aligned with the insertion hole 131i. In a state in which the trunnion 131 and the beam 132 are aligned with each other, fastening members P2 such as screws are inserted into the insertion holes 131i, 132d, from the extending direction of the pair of side walls 131b, 131c. In this way, the beam 132 can be threadingly engaged with the trunnion 131 at a plurality of points.

As shown in FIG. 8, the periphery of a third opening 131n formed in the end surface 131f and the periphery of a fourth opening 132f formed in the beam 132 are butted with each other with an O-ring 138 interposed between the third opening 131n and the fourth opening 132f. an oil passage F12 of the trunnion 131 and an oil passage F14 of the beam 132 are connected to each other.

The number of the restricting portions provided in the beam and the number of the injection ports provided in the beam are not limited to four described in the above-described embodiment. The number of the restricting portions and the number of the injection ports may be three or less, or five or more. The number of the injection ports may be less than the number of the restricting portions. For example, in the transmission unit 129 of FIG. 8, one restricting portion 132b and one extended portion 132c continuous with this restricting portion 132b may be provided at a location which is in the vicinity of each of the both ends of the beam 132 in the lengthwise direction. When viewed from above (in a top view), the two extended portions 132c are point-symmetric with respect to a center of the beam 132 in the lengthwise direction. When the oil is externally fed, the oil flows through the oil passages F12, F14, and then through oil passages F15 connected to the oil passage F14, and then is injected from injection ports 132e formed in the extended portions 132c, toward the contact region Q of the peripheral surface 34b of the power roller 34.

Modified Example 2

Figure 9:
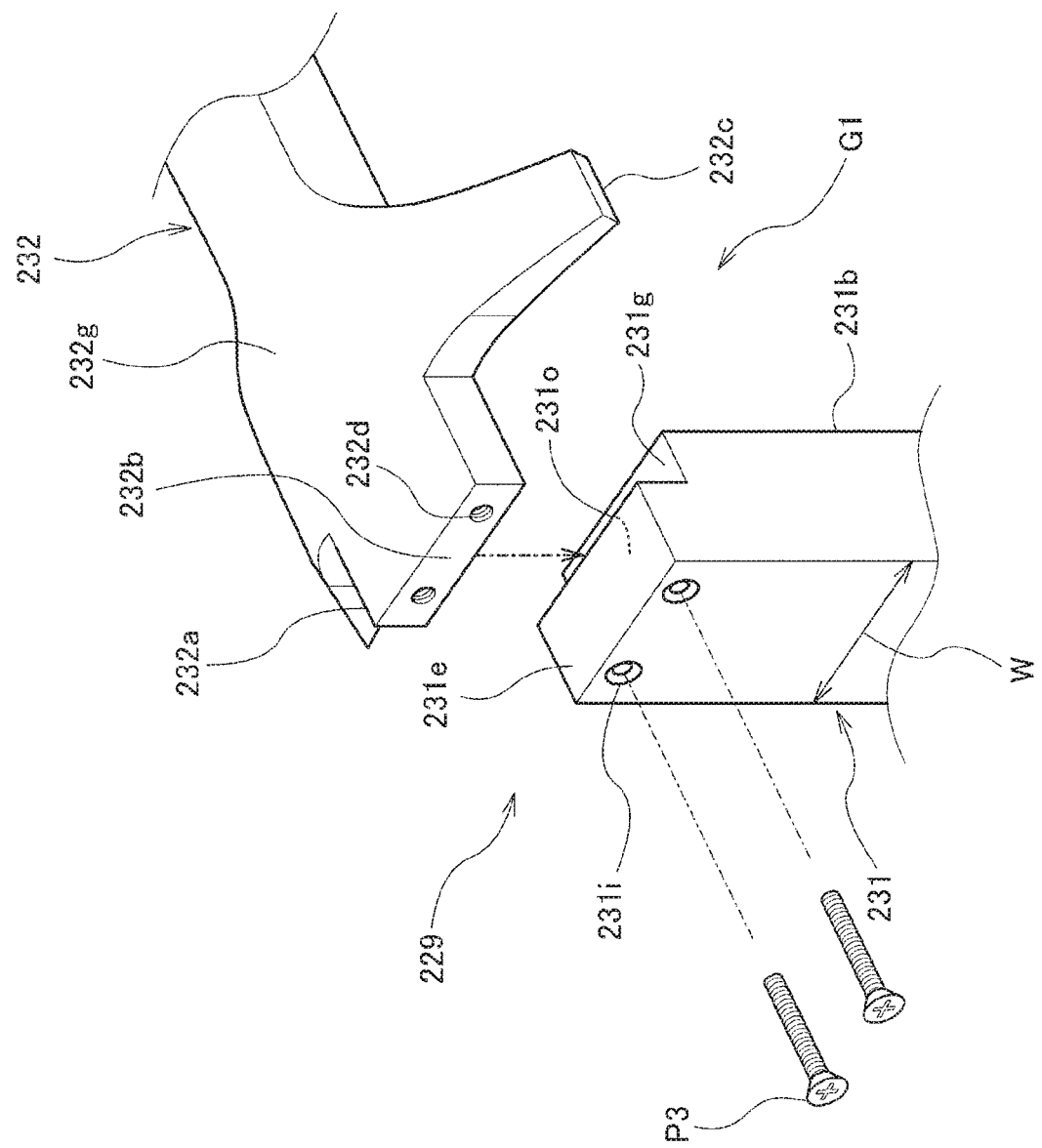
FIG. 9 is a fragmentary view showing a trunnion and a beam of a transmission unit according to Modified example 2.

The width of the contact portions provided in the beam may be set larger than that of the contact portions 32a of the above-described embodiment. FIG. 9 is a fragmentary view showing a trunnion 231 and a beam 232 of a transmission unit 229 according to Modified example 2. As shown in FIG. 9, the trunnion 231 has an end surface 231g. Specifically, the end surface 231g is formed by cutting a portion of the tip end portion of a side wall 231b, the portion being close to the space G1, over an entire width W. In this structure, the tip end portion of the side wall 231b includes portions which are different in protruding height. Specifically, the tip end portion of the side wall 231b includes an end surface 231e which is higher and the end surface 231g which is lower. Also, the tip end portion of the side wall 231b includes a side surface 231o connecting the end surface 231e to the end surface 231g.

The beam 232 includes a body portion 232g, a contact portion 232a, and a restricting portion 232b. The body portion 232g is elongated. The contact portion 232a protrudes outward from one end of the body portion 232g in a lengthwise direction thereof. The contact portion 232a has a width which is almost equal to that of the beam 32. The restricting portion 232b is formed by the end surface of the beam 232 in the lengthwise direction. Specifically, in the present modified example, the restricting portion 232b is formed by the end surface of the contact portion 232a in the lengthwise direction.

In a state in which the beam 232 is joined to the side wall 231b, the end surface 231g of the side wall 231b and the contact portion 232a of the beam 232 are in surface contact with each other. Each of the end surface 231g and the contact portion 232a partially has a flat surface for the surface contact. In the same manner, the side surface 231o of the side wall 231b and the restricting portion 232b of the beam 232 are in surface contact with each other. Each of the side surface 231o and the restricting portion 232b partially has a flat surface for the surface contact.

The side surface of the side wall 231b has a plurality of insertion holes 231i extending in the lengthwise direction of the beam 232 and the restricting portion 232b of the beam 232 has a plurality of insertion holes 232d extending in the lengthwise direction of the beam 232, at locations where the insertion holes 231i and the insertion holes 232d are aligned with each other in a state in which the beam 232 is mounted on the side wall 231b. The trunnion 231 and the beam 232 of the transmission unit 229 are provided with a similar structure corresponding to the end surface 231g and the contact portion 232a, on the other end side of the beam 232 in the lengthwise direction.

During assembling of the transmission unit 229, the lower surface of the contact portion 232a contacts the end surface 231g and the side surface 231o of the end surface 231g which extends along the extending direction of the side wall 231b contacts the restricting portion 232b. In this way, the trunnion 231 and the beam 232 are quickly and properly aligned with each other, in both of the extending direction of the side wall 231b and the lengthwise direction of the beam 232. By inserting fastening members P3 such as screws into the insertion holes 231i, 232d from the lengthwise direction of the beam 232, in a state in which the trunnion 231 and the beam 232 are positioned with each other, the beam 232 can be easily threadingly engaged with the trunnion 231 at a plurality of points. In the transmission unit 229, since the restricting portion 232b of the beam 232 is in surface contact with the side surface 231o of the trunnion 231, the trunnion 231 is effectively reinforced by the beam 232, from a location opposite to the trunnion 131, when viewed from a position of the power roller (not shown).

(Others)

The present invention is not limited to the above-described embodiment, and the configuration thereof can be changed, added or deleted within a scope of the invention. The above-described embodiment and the modified examples may be combined as desired. For example, a part of any one of the modified examples may be applied to the above-described embodiment.

The type of the toroidal CVT is not limited to the double cavity type, and may be a single cavity type. The insertion holes formed in the pair of side walls are not necessarily formed in both of the side walls and may be formed in the side surface of at least one of the side walls in such a manner that the insertion holes penetrate the side wall in the axial direction of the tilt motion shaft to the restricting portion of the beam.

In the configurations of the above-described embodiment and modified examples, the beam is provided with the extended portions, the oil passage is formed inside the beam, and the oil which has flowed through the oil passage formed inside the beam is injected from the injection ports of the extended portions toward the peripheral surface of the power roller. Alternatively, the oil passages and the injection ports may not be provided in the beam. In this case, for example, the oil passage may be formed inside one of the pair of side walls of the trunnion, the injection port connected to this oil passage may be formed in the side wall, and the oil may be injected from the injection port formed in the side wall toward the power roller.

The transmission described in the above-described embodiment and modified examples may be used in electric power generating devices which are other than the electric power generating device for the aircraft, automobiles or industrial machines, as well as the electric power generating device for the aircraft.

REFERENCE SIGNS LIST

A3 tilt motion axis
E1 first oil passage
E2 second oil passage
Q contact region of peripheral surface of rotary section which contacts surface of each of input disc and output disc
P1 to P3 fastening member
1 electric power generating device for aircraft
2 device input shaft
3 transmission (toroidal continuously variable transmission)
4 electric power generator
5 driving force transmission mechanism
6 casing
6a mounting section
26 input disc
27 output disc
30 power roller
31, 131, 231 trunnion
31a, 131a base
31b, 31c, 131b, 131c, 231b side wall
31e, 31f, 131e, 131f, 231e end surface
31n, 131n opening of first oil passage
32, 132, 232 beam
32a, 132a, 232a contact portion
32c, 132c, 232c extended portion
32e, 132e injection port
32f, 132f opening of second oil passage
32g, 132g, 232g body portion
34 power roller
34b peripheral surface of power roller

The invention claimed is:

1. A toroidal continuously variable transmission comprising:
an input disc and an output disc which are disposed to face each other;
a power roller which is tiltably disposed between the input disc and the output disc and transmits a rotational driving force of the input disc to the output disc in a transmission ratio corresponding to a tilt motion angle of the power roller;
a trunnion including a base on which the power roller is rotatably mounted, and a pair of side walls provided on both sides of the power roller in an axial direction of a tilt motion shaft of the power roller in such a manner that the pair of side walls extend upward from the base and face a peripheral surface of the power roller; and
a beam mounted on the pair of side walls, the beam extending in the axial direction of the tilt motion shaft, on a side opposite to the base when viewed from a position of the power roller, wherein the beam includes a pair of contact portions, each of the contact portions being configured to contact an end surface of a tip end side of each of the pair of side walls, and a pair of restricting portions configured to contact side surfaces of the pair of side walls, respectively, the side surfaces facing each other, to restrict a movement of the pair of side walls in a direction in which the pair of side walls approach each other,
wherein the trunnion and the beam include an oil passage which flows oil used for forming an oil film on the peripheral surface of the power roller, and the oil passage includes a first oil passage formed inside the trunnion, and a second oil passage formed inside the beam and connected to an opening of the first oil passage which is formed in one of the pair of side walls, and
wherein the second oil passage includes an oil passage extending from the opening in a lengthwise direction of the beam in such a manner that the oil passage is located outward of the power roller in a radial direction of the tilt motion shaft.

2. The toroidal continuously variable transmission according to claim 1,
wherein each of end surfaces of the pair of side walls has a groove, with which the contact portion is engageable,
wherein each of the contact portions is configured to contact a bottom surface of the groove, to restrict a movement of the beam in a direction in which the beam approaches the base, and contact a side surface of the groove, to restrict a movement of the beam in a widthwise direction of the beam.

3. An integrated drive generator comprising:
an input shaft to which a driving force of an engine is transmitted;
the toroidal continuously variable transmission according to claim 2;
an electric power generator actuated by an output of the toroidal continuously variable transmission;
a driving force transmission mechanism which transmits the output of the toroidal continuously variable transmission to the electric power generator; and
a casing accommodating the input shaft, the toroidal continuously variable transmission, the electric power generator, and the driving force transmission mechanism.

4. The toroidal continuously variable transmission according to claim 1,
wherein each of the pair of side walls has an insertion hole, which penetrates the side wall in the axial direction of the tilt motion shaft to each of the pair of restricting portions, and
wherein the beam is mounted on the trunnion by a fastening member inserted into the insertion hole.

5. The toroidal continuously variable transmission according to claim 4,
wherein the fastening member is disposed outward in a width direction of the beam, relative to the oil passage extending in the lengthwise direction of the beam.

6. An integrated drive generator comprising:
an input shaft to which a driving force of an engine is transmitted;
the toroidal continuously variable transmission according to claim 5;
an electric power generator actuated by an output of the toroidal continuously variable transmission;

a driving force transmission mechanism which transmits the output of the toroidal continuously variable transmission to the electric power generator; and a casing accommodating the input shaft, the toroidal continuously variable transmission, the electric power generator, and the driving force transmission mechanism.

7. An integrated drive generator comprising:
an input shaft to which a driving force of an engine is transmitted;
the toroidal continuously variable transmission according to claim 4;
an electric power generator actuated by an output of the toroidal continuously variable transmission;
a driving force transmission mechanism which transmits the output of the toroidal continuously variable transmission to the electric power generator; and
a casing accommodating the input shaft, the toroidal continuously variable transmission, the electric power generator, and the driving force transmission mechanism.

8. The toroidal continuously variable transmission according to claim 1,
wherein the beam is provided with an injection port to inject the oil which has flowed through the second oil passage, toward the peripheral surface of the power roller.

9. An integrated drive generator comprising:
an input shaft to which a driving force of an engine is transmitted;
the toroidal continuously variable transmission according to claim 8;
an electric power generator actuated by an output of the toroidal continuously variable transmission;
a driving force transmission mechanism which transmits the output of the toroidal continuously variable transmission to the electric power generator; and
a casing accommodating the input shaft, the toroidal continuously variable transmission, the electric power generator, and the driving force transmission mechanism.

10. The toroidal continuously variable transmission according to claim 8,
wherein the injection port is configured to inject the oil to be injected from a tangential direction with respect to the peripheral surface of the power roller, toward a contact region at which the power roller contacts each of the input disc and the output disc.

11. An integrated drive generator comprising:
an input shaft to which a driving force of an engine is transmitted;
the toroidal continuously variable transmission according to claim 10;
an electric power generator actuated by an output of the toroidal continuously variable transmission;
a driving force transmission mechanism which transmits the output of the toroidal continuously variable transmission to the electric power generator; and
a casing accommodating the input shaft, the toroidal continuously variable transmission, the electric power generator, and the driving force transmission mechanism.

12. The toroidal continuously variable transmission according to claim 8,
wherein the beam includes an extended portion extending toward the peripheral surface of the power roller, and the injection port is provided in the extended portion.

13. An integrated drive generator comprising:
an input shaft to which a driving force of an engine is transmitted;
the toroidal continuously variable transmission according to claim 12;
an electric power generator actuated by an output of the toroidal continuously variable transmission;
a driving force transmission mechanism which transmits the output of the toroidal continuously variable transmission to the electric rower generator: and
a casing accommodating the input shaft, the toroidal continuously variable transmission, the electric power generator, and the driving force transmission mechanism.

14. The toroidal continuously variable transmission according to claim 1,
wherein the opening of the first oil passage is provided in the end surface of the one of the pair of side walls,
wherein an opening of the second oil passage is provided in a surface of the contact portion which contacts the end surface having the opening of the first oil passage, and
wherein in a state in which the contact portion is in contact with the end surface, a periphery of the opening of the first oil passage and a periphery of the opening of the second oil passage are butted with each other, and the first oil passage and the second oil passage are connected to each other.

15. An integrated drive generator comprising:
an input shaft to which a driving force of an engine is transmitted;
the toroidal continuously variable transmission according to claim 14;
an electric power generator actuated by an output of the toroidal continuously variable transmission;
a driving force transmission mechanism which transmits the output of the toroidal continuously variable transmission to the electric power generator; and
a casing accommodating the input shaft, the toroidal continuously variable transmission, the electric power generator, and the driving force transmission mechanism.

16. An integrated drive generator comprising:
an input shaft to which a driving force of an engine is transmitted;
the toroidal continuously variable transmission according to claim 1;
an electric power generator actuated by an output of the toroidal continuously variable transmission;
a driving force transmission mechanism which transmits the output of the toroidal continuously variable transmission to the electric power generator; and
a casing accommodating the input shaft, the toroidal continuously variable transmission, the electric power generator, and the driving force transmission mechanism.

17. A toroidal continuously variable transmission comprising:
an input disc and an output disc which are disposed to face each other;
a power roller which is tiltably disposed between the input disc and the output disc and transmits a rotational driving force of the input disc to the output disc in a transmission ratio corresponding to a tilt motion angle of the power roller;
a trunnion including a base on which the power roller is rotatably mounted, and a pair of side walls provided on both sides of the power roller in an axial direction of a tilt motion shaft of the power roller in such a manner that the pair of side walls extend upward from the base and face a peripheral surface of the power roller; and a beam mounted on the pair of side walls, the beam extending in the axial direction of the tilt motion shaft, on a side opposite to the base when viewed from a position of the power roller, wherein the beam includes a pair of contact portions, each of the contact portions being configured to contact an end surface of a tip end side of each of the pair of side walls, and a pair of restricting portions configured to contact side surfaces of the pair of side walls, respectively, the side surfaces facing each other, to restrict a movement of the pair of side walls in a direction in which the pair of side walls approach each other, wherein the trunnion and the beam include an oil passage which flows oil used for forming an oil film on the peripheral surface of the power roller, and the oil passage includes a first oil passage formed inside the trunnion and a second oil passage formed inside the beam and connected to an opening of the first oil passage which is formed in one of the pair of side walls, and wherein the second oil passage includes an oil passage extending from the opening in a lengthwise direction of the beam, and an oil passage branched or bent from the oil passage extending in the lengthwise direction of the beam.

18. An integrated drive generator comprising:

an input shaft to which a driving force of an engine is transmitted;

the toroidal continuously variable transmission according to claim 17;

an electric power generator actuated by an output of the toroidal continuously variable transmission;

a driving force transmission mechanism which transmits the output of the toroidal continuously variable transmission to the electric power generator; and a casing accommodating the input shaft, the toroidal continuously variable transmission, the electric power generator, and the driving force transmission mechanism.

* * * * *